(12) United States Patent
Campbell et al.

(10) Patent No.: US 8,584,553 B2
(45) Date of Patent: Nov. 19, 2013

(54) HOUSING ASSEMBLY AND METHOD OF ASSEMBLING THE SAME

(75) Inventors: James Michael Campbell, Aberdeen, SD (US); Harold Oscar Schlenker, Aberdeen, SD (US); Larry Gene Anderson, Aberdeen, SD (US)

(73) Assignee: Hub City, Inc., Aberdeen, SD (US)

( * ) Notice: Subject to any disclaimer, the term of this patent is extended or adjusted under 35 U.S.C. 154(b) by 224 days.

(21) Appl. No.: 12/143,416

(22) Filed: Jun. 20, 2008

(65) Prior Publication Data

US 2009/0314132 A1 Dec. 24, 2009

(51) Int. Cl.
*F16H 57/02* (2012.01)

(52) U.S. Cl.
USPC ........................................ 74/606 R

(58) Field of Classification Search
USPC ........................... 74/606 R; 184/6.12
See application file for complete search history.

(56) References Cited

U.S. PATENT DOCUMENTS

| | | | | |
|---|---|---|---|---|
| 2,427,168 A | * | 9/1947 | Thompson et al. | 475/317 |
| 2,950,635 A | * | 8/1960 | Bieger et al. | 475/338 |
| 3,234,808 A | * | 2/1966 | Nelson | 74/421 A |
| 3,434,366 A | * | 3/1969 | Eisenhart et al. | 74/421 R |
| 4,499,829 A | | 2/1985 | Jacobson et al. | |
| 5,099,717 A | * | 3/1992 | Ochiai et al. | 74/606 R |
| 5,747,903 A | | 5/1998 | Klingler | |
| 6,940,194 B1 | * | 9/2005 | Lauk | 310/90 |
| 6,971,277 B2 | | 12/2005 | Schlenker | |
| 7,044,412 B2 | | 5/2006 | Hemond et al. | |
| 7,052,429 B1 | * | 5/2006 | Phanco et al. | 475/161 |
| 2004/0164634 A1 | * | 8/2004 | Oh et al. | 310/98 |
| 2005/0132841 A1 | * | 6/2005 | Muller | 74/606 R |
| 2005/0241436 A1 | * | 11/2005 | Leimann | 74/606 R |

FOREIGN PATENT DOCUMENTS

JP 59025059 A * 2/1984

* cited by examiner

*Primary Examiner* — Vicky Johnson
(74) *Attorney, Agent, or Firm* — Armstrong Teasdale LLP (57) ABSTRACT

A housing assembly for a gear drive is provided. The housing assembly includes an end member having a mating surface, and a body member extending from the end member. The body member includes a mating surface coupled to the end member with a mating arrangement and forming a joint.

14 Claims, 7 Drawing Sheets

HOUSING ASSEMBLY AND METHOD OF ASSEMBLING THE SAME

BACKGROUND OF THE INVENTION

The field of the invention relates generally to gear drives, and more specifically to non-corrosive gear drive housings configured to prevent entrapment of foreign materials.

Many industries, i.e. the food preparation industry, require a sanitary and hygienic work environment, oftentimes mandated by compliance regulations. Food processing equipment within this industry must meet or exceed these standards. Known food processing equipment use gear drive assemblies to facilitate powering food preparation machines. Some known gear drives are fabricated from ferrous and/or metallic materials and are typically coated to prevent corrosion. However, such gear drives may be difficult to adequately clean and maintain compliance with the aforementioned regulations, and such coatings may chip or crack thus exposing the gear drive to potentially corrosive substances as well as potentially contaminating nearby food products.

Some other known gear drives include complex external surfaces that may promote the accumulation of foreign or deleterious materials. Due to the relatively sharp corners defined between adjacent surfaces of such gear casings, processed food may become lodged in crevices formed between adjacent surfaces. Although a periodic cleaning operation may be performed on such gear casings to remove any food particles, such cleaning operations may be time consuming and labor intensive and may fail to adequately clean such surfaces.

BRIEF DESCRIPTION OF THE INVENTION

In one aspect, a housing assembly for a gear drive is provided. The housing assembly includes a first end member having a mating surface, a second end member having a mating surface, and a body member extending between the first end member and the second end member. The body member includes a first mating surface coupled to the first end member with a mating arrangement and forming a first joint. The body member also includes opposing second mating surface coupled to the second end member with a mating arrangement and forming a second joint.

In another aspect, a gear drive assembly is provided that includes a motor configured to power the gear drive assembly, and a housing that includes a first end member having a mating surface, a second end member having a mating surface, and a body member extending between the first end member and the second end member. The body member includes a first mating surface coupled to the first end member with a mating arrangement and forming a first joint. The body member also includes a second mating surface opposite the first mating surface and coupled to the second end member with a mating arrangement and forming a second joint. The gear drive assembly includes a flange configured to abut the motor connecting flange, a gear drive disposed within the housing that includes a drive shaft extending through an aperture disposed within the first end member, and a gasket configured to seal an interface between the motor flange and the housing flange.

In another aspect, a method for assembling a gear drive housing is provided. The method includes providing a housing that includes a first end member having a mating surface, a second end member having a mating surface, and a body member extending between the first end member and the second end member. The body member includes a first mating surface coupled to the first end member with a mating arrangement and forming a first joint. The body member also includes an opposing second mating surface coupled to the second end member with a mating arrangement and forming a second joint. The method also includes coupling the first end member and the second end member to corresponding ends of the body member using an adhesive.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION OF THE INVENTION

Figure 1:
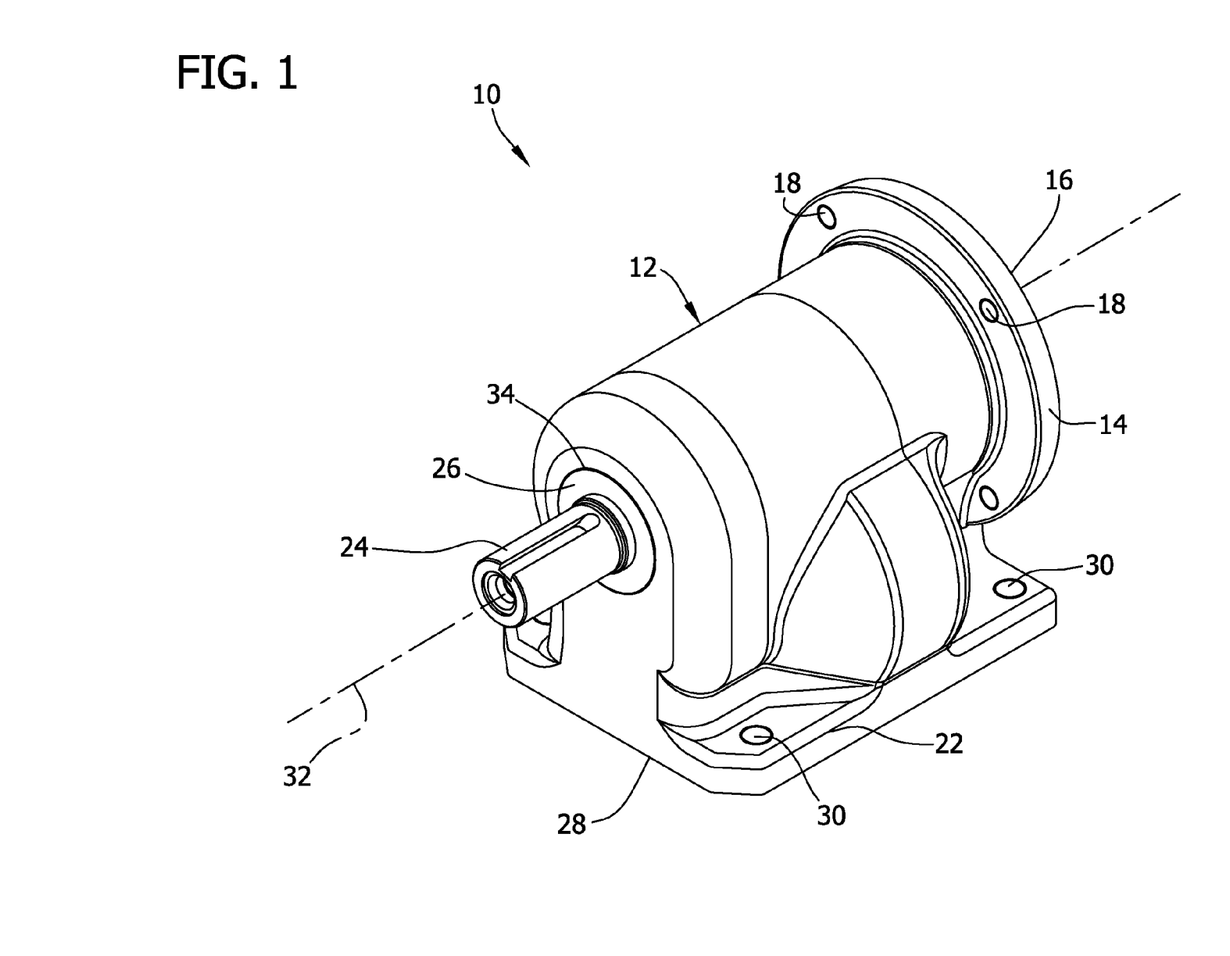
FIG. 1 is a perspective view of a gear drive with an exemplary housing assembly.
Figure 2:
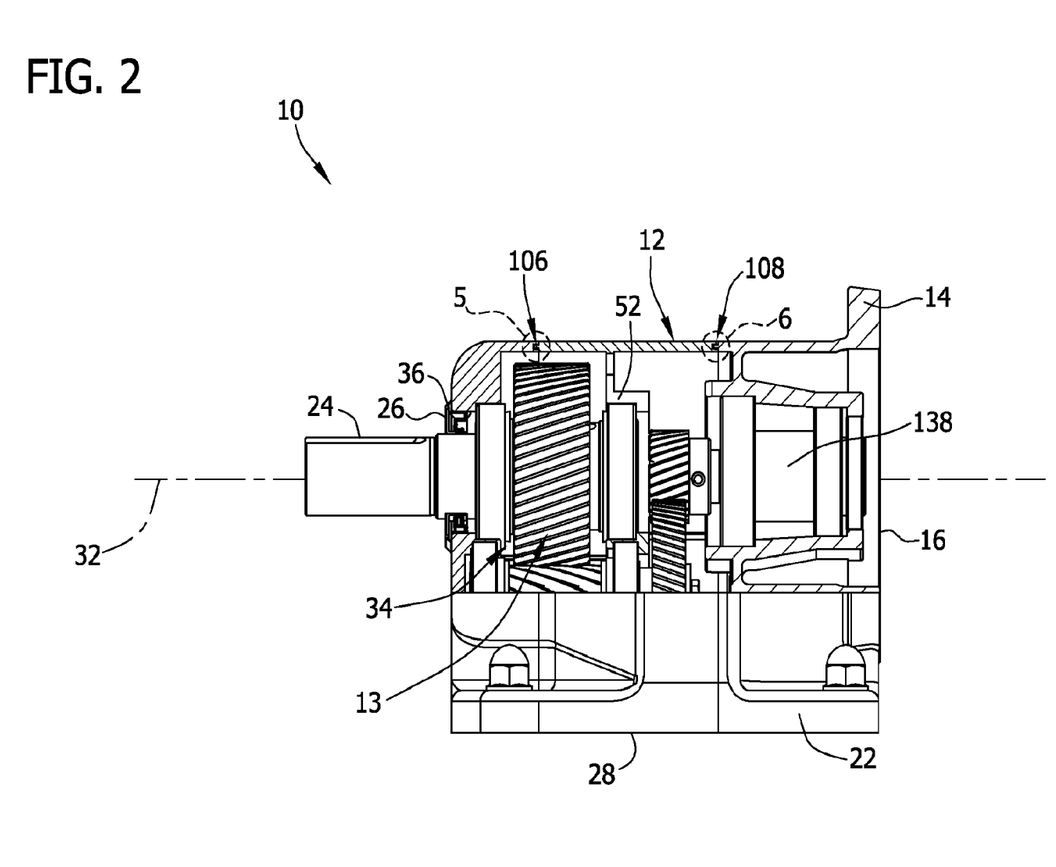
FIG. 2 is a partial cut-away side view of the gear drive with the housing assembly shown in FIG. 1.

Referring to FIGS. 1 and 2, FIG. 1 is a perspective view of a gear drive assembly 10 with an exemplary housing assembly 12, and FIG. 2 is a partial cut-away side view of gear drive assembly 10 shown in FIG. 1. Gear drive assembly 10 includes a gear drive 13 (shown in FIG. 2), and an input flange 14 that extends from a substantially flat housing input surface 16. Input flange 14 includes at least one bolt hole 18 that enables an input device, i.e. a motor 130 (shown in FIG. 7) to be coupled to input surface 16. Gear drive assembly 10 includes a mounting base 22, an output shaft 24, and a substantially annular shaft sleeve 26 configured to prevent outside contaminates and/or moisture from entering housing assembly 12 along output shaft 24 and prevents lubrication (not shown) from leaking out of housing assembly 12. Mounting base 22 extends from a substantially flat housing surface 28 and includes at least one bolt hole 30 that enables gear drive assembly 10 to be secured to a stable surface (not shown), i.e. a table top or a floor, for example. In the exemplary embodiment, gear drive is an inline gear drive. In another embodiment, gear drive 13 is a parallel gear drive, a right-angle gear drive, or of any configuration that enables gear drive assembly 10 to function as described herein.

Housing assembly 12 includes a longitudinal axis 32, and a substantially annular aperture 34 that is radially aligned with longitudinal axis 32, and is sized and oriented to receive output shaft 24. Output shaft 24 is sized so as not to contact aperture inner surface 36 during operations. Shaft sleeve 26 is disposed between output shaft 24 and aperture inner surface 36. In the exemplary embodiment, output shaft 24 and shaft sleeve 26 are fabricated from a non-ferrous, non-corrosive material, i.e. stainless steel, for example. In another embodiment, output shaft 24 and shaft sleeve 26 is fabricated from any non-ferrous, non-corrosive material that allows gear drive assembly 10 to function as described herein.

Housing assembly 12 is fabricated from a non-metallic, non corrosive material, such as a polymer or a plastic. In the exemplary embodiment, the polymer is Zytel® HTN 51G45HSL commercially available from DuPont® Company, Wilmington, Del. In an alternative embodiment, the polymer is Zytel® HTN 51GM45 or Zytel® HTN 51GM50. In yet another embodiment, the polymer may be Ryton® R-7, commercially available from Chevron Phillips Chemical Company LP, The Woodlands, Tex. Alternatively, the housing assembly 12 may be fabricated from any non-metallic material that enables the gear drive assembly 10 to function as described herein. Housing assembly 12 is fabricated with a smoothly contoured external surface to facilitate cleaning the entire external surface.

Figure 3:
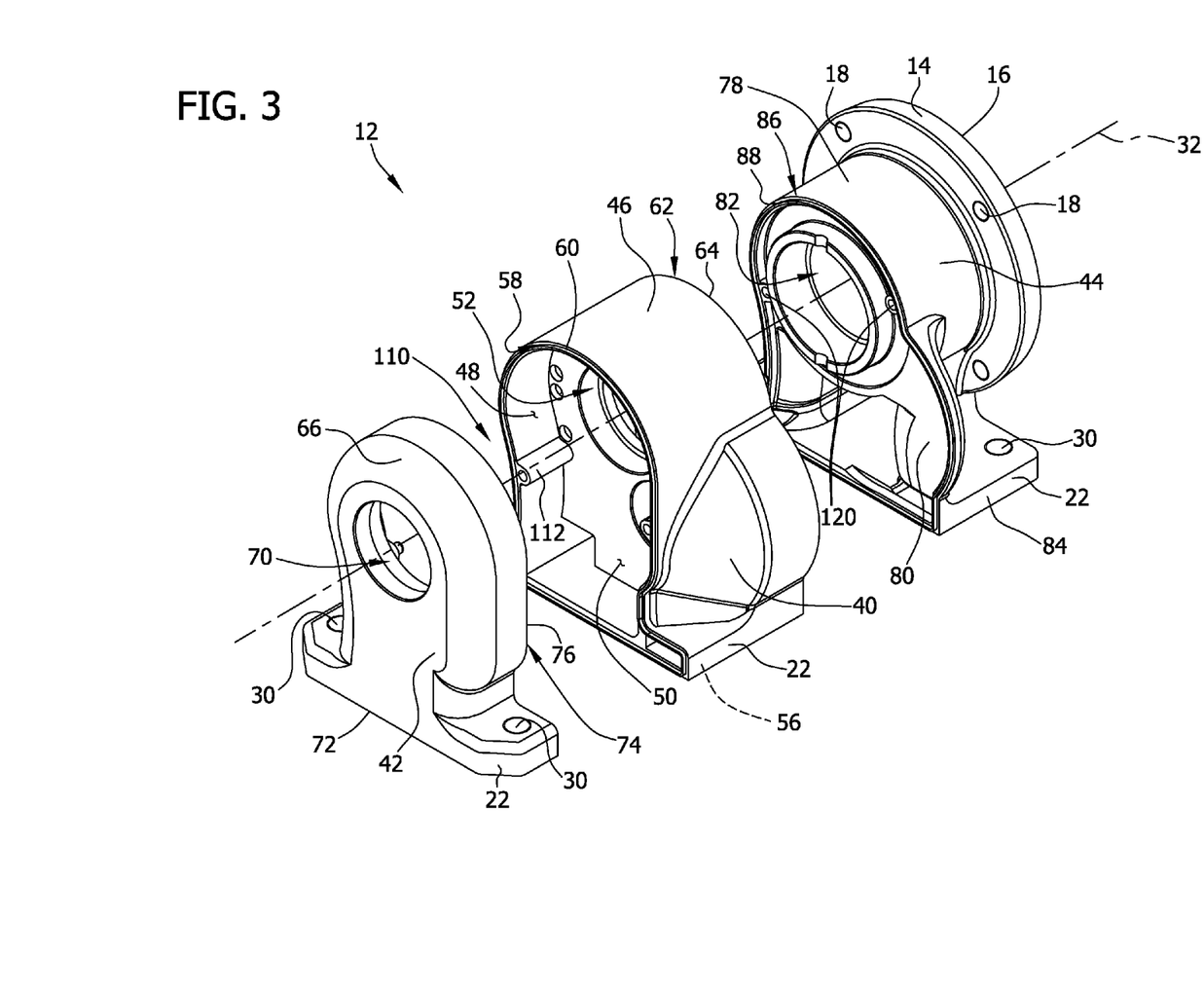
FIG. 3 is a rear perspective assembly view of the housing assembly shown in FIG. 1.
Figure 4:
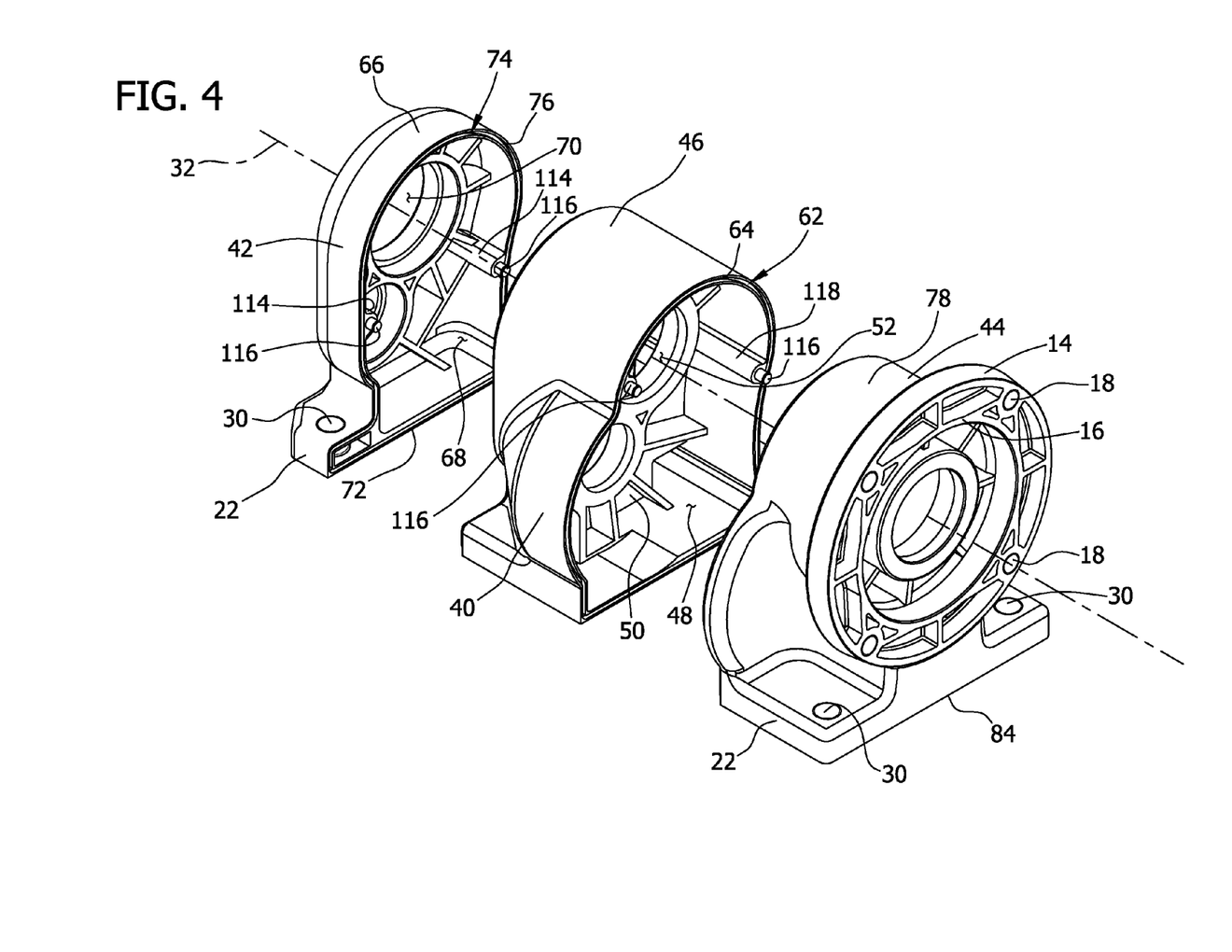
FIG. 4 is a front perspective assembly view of the housing assembly shown in FIG. 1.

Referring to FIGS. 3 and 4, FIG. 3 is a rear perspective assembly view of the housing assembly 12 shown in FIG. 1, and FIG. 4 is a front perspective assembly view of the housing assembly 12 shown in FIG. 1. In the exemplary embodiment, housing assembly 12 includes a body member 40 that extends between a first end member 42 and a second end member 44. In the exemplary embodiment, members 40, 42, 44 are injection molded and include a smooth contoured external surface, as discussed in more detail herein. In another embodiment, members 40, 42, 44 are fabricated by any process that enables each member to be coupled to one another in a non-interrupted fashion. Body member 40 includes an external contoured surface 46, an internal surface 48 and a wall 50 that extends radially inward from internal surface 48 and that includes an aperture 52 configured to support at least a portion of gear drive 13, as illustrated in FIG. 2. At least a portion of mounting base 22 extends from a bottom surface 56 of body member 40. Body member 40 includes a first mating surface 58 that is disposed along a first edge 60 and an opposing second mating surface 62 that is disposed along a second edge 64.

First end member 42 includes an external contoured surface 66, an internal surface 68, and a substantially cylindrical aperture 70 that is radially aligned with longitudinal axis 32. At least a portion of mounting base 22 extends from a first end member bottom surface 72 and includes at least one bolt hole 30 that enables gear drive assembly 10 to be secured to a substantially stable surface, as described herein. First end member 42 includes a mating surface 74 that is disposed along an edge 76 that is positioned upon first end member 42 opposite from aperture 70 along longitudinal axis 32.

Second end member 44 includes an external contoured surface 78 and an internal surface 80. Second end member 44 includes a substantially cylindrical aperture 82 that is radially aligned with longitudinal axis 32. At least a portion of mounting base 22 extends from a second end member bottom surface 84 and includes at least one bolt hole 30 that enables gear drive assembly 10 to be secured to a stable surface, as described herein. Second end member 44 includes an input flange 14 that extends from a substantially flat housing input surface 16. Input flange 14 includes at least one bolt hole 18 that enables an input device 130 to be couple thereto, as described herein. Second end member 44 includes a mating surface 86 that is disposed along an edge 88 that is positioned upon second end member 44 opposite from input surface 16 along longitudinal axis 32.

Figure 5:
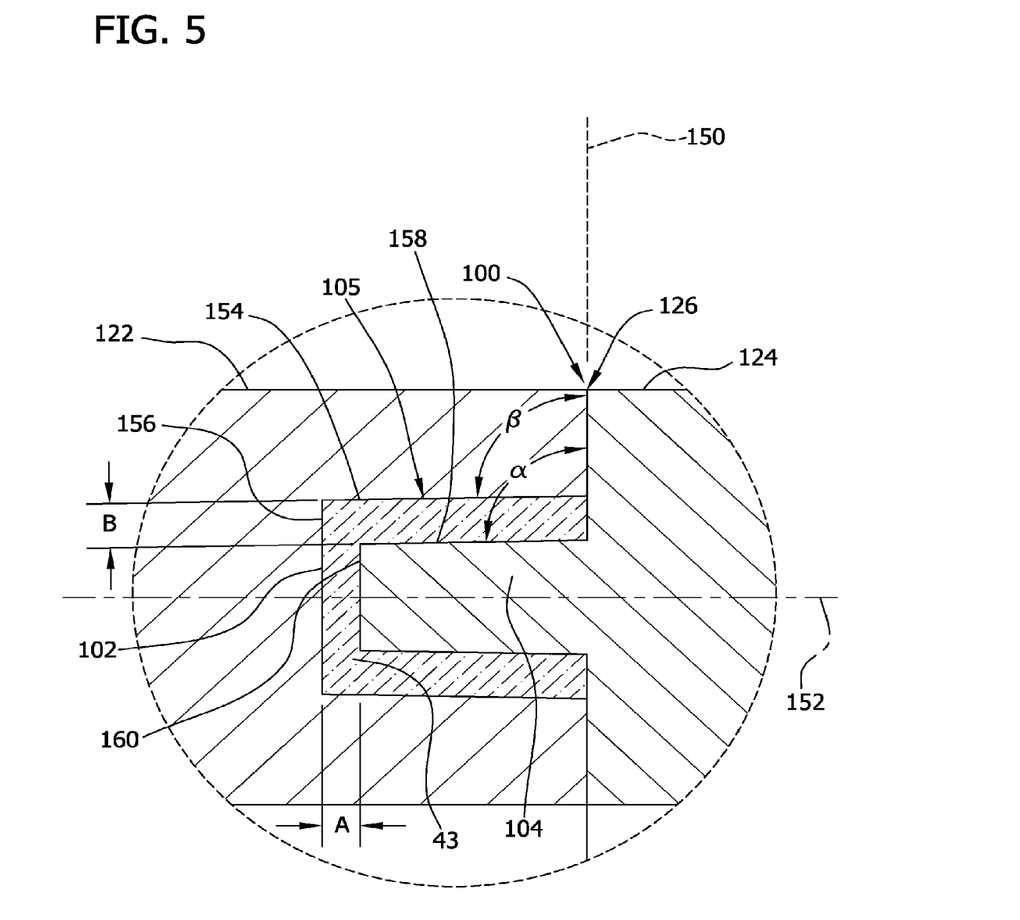
FIG. 5 is an enlarged cross-sectional view of an exemplary mating configuration for a joint that may be used with the gear drive shown in FIG. 1, and taken along area 5 shown in FIG. 2.
Figure 6:
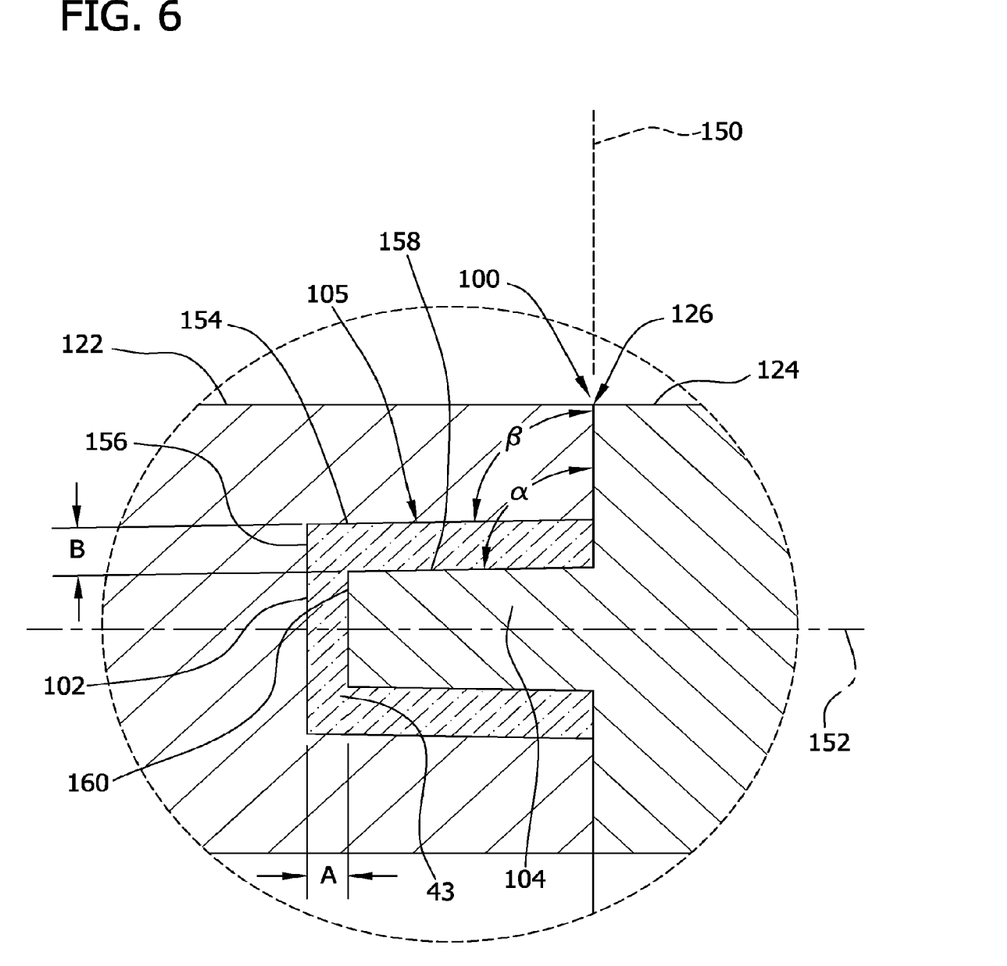
FIG. 6 is an enlarged cross-sectional view of an alternative mating configuration for a joint that may be used with the gear drive shown in FIG. 1, and taken along area 5 shown in FIG. 2.

FIG. 5 is an enlarged cross-sectional view of an exemplary mating configuration for a joint 100 that, in one embodiment, is used with housing assembly 12 shown in FIG. 2, and taken along area 5. FIG. 6 is an enlarged cross-sectional view of an alternative mating configuration for a joint that is used with the housing assembly 12 shown in FIG. 2, and taken along area 5. In the exemplary embodiment, housing assembly 12 includes two joints 100, a first joint 106 and a second joint 108, as shown in FIG. 2. First end member mating surface 74 is coupled to body member first mating surface 58 at first joint 106. Similarly, second end member mating surface 86 is coupled to body member second mating surface 62 at second joint 108. Alternatively, housing assembly 12 includes two end members (not shown) forming one joint.

Joint 100 defines a joint plane 150 extending perpendicularly from a center line 152. In the exemplary embodiment, joint 100 is a tongue and groove type joint that includes a slot 102 and a ridge 104, wherein slot 102 is sized and oriented to receive ridge 104 formed along body member first mating surface edge 60 such that a gap 105 remains following ridge 104 insertion into slot 102. More specifically, slot 102 includes a side wall 154 and an end wall 156 and ridge 104 includes a side wall 158 and an end wall 160, each oriented such that slot end wall 156 and ridge end wall 160 are substantially parallel and separated by a distance A and slot side wall 154 and ridge side wall 158 are substantially parallel and separated by a distance B to allow an amount of an adhesive 43 to be inserted, as described in more detail herein. In the exemplary embodiment, A and B are 0.02 inches. Alternatively, distances A and B are any length that enables housing assembly 12 to function as described herein. Additionally, slot 102 is fabricated such that slot side wall 154 extends at an angle α from joint plane 150. Similarly, ridge 104 is fabricated such that ridge side wall 158 extends at an angle β from joint plane 150. In the exemplary embodiment, α and β are 91°. Alternatively, angles α and β range from about 90° to about 93°. In yet another embodiment, angles α and β may be any angle that enables housing assembly 12 to function as described herein.

Alternatively and as illustrated in FIG. 6, ridge 104 is non-tapered and is received within a substantially rectangular slot 102. More specifically, slot 102 is fabricated such that slot side wall extends at an angle of 90° from joint plane 150, such that no taper exists. Similarly, ridge 104 is fabricated such that ridge side wall 158 extends at an angle 90° from joint plane 150, such that no taper exists. In another embodiment, slot 102 and ridge 104 are friction-fit such that substantially no gap 105 remains following insertion of ridge 104 into slot 102.

Body member 40 and first end member 42 are affixed to one another using plastic epoxy 43, which, in the exemplary embodiment, substantially fills gap 105. In one embodiment, plastic epoxy 43 is Plastic Welder∩ II adhesive, commercially available from ITW Devcon®, Danvers, Mass. Alternatively, the plastic epoxy may be any adhesive that enables housing assembly 12 to function as described herein. First end member mating surface 74 is coupled to body member first mating surface 58 at first joint 106, which is a tongue and groove configuration as described herein, and includes slot 102 formed within first end member mating surface edge 76 that is sized and oriented to receive ridge 104 formed along body member first mating surface edge 60. In an alternative embodiment, body member first mating surface 58 is fitted with a slot 102 and first end member mating surface 74 fitted with a ridge 104 to form the tongue and groove configuration of first joint 106. In another embodiment, first joint 106 may be fitted with any type of connection, i.e. a sonic weld, a rabbet joint, a dovetail joint, a splice joint, or a bridle joint, that enables housing assembly 12 to function as described herein. In yet another embodiment, first joint 106 includes at least one mechanical fastener (not shown) positioned internally and configured to couple body member 40 and first end member 42 to one another.

In the exemplary embodiment, second joint 108 is a tongue and groove configuration as described herein, and includes a slot 102 formed within body member second mating surface edge 64 that is sized and oriented to receive a ridge 104 formed along second end member mating surface edge 88. Body member 40 and second end member 44 are affixed to one another using a plastic epoxy as described in detail herein. In an alternative embodiment, body member second mating surface 62 may be fitted with a ridge 104 and second end member mating surface 86 fitted with a slot 102 to form the tongue and groove configuration of second joint 108. In another embodiment, second joint 108 may be fitted with any type of connection, i.e. a sonic weld, a rabbet joint, a dovetail joint, a splice joint, or a bridle joint, that enables housing assembly 12 to function as described herein. In yet another embodiment, second joint 108 includes at least one mechanical fastener (not shown) positioned internally and configured to couple body member 40 and second end member 44 to one another.

Referring again to FIGS. 3 and 4, to facilitate assembly, housing assembly 12 is fabricated with a pin and receptacle alignment system 110, shown in FIG. 3. In the exemplary embodiment, body member first mating surface 58 includes at least one pin receptacle 112 (shown in FIG. 3 in two locations) disposed upon body member internal surface 48 and positioned adjacent to edge 60. Similarly, first end member 42 includes at least one pin receptacle 114 (shown in FIG. 4 in two locations) disposed upon first end member internal surface 68 and sized to receive at least a portion of an alignment pin 116 therein. Pin receptacles 112, 114 are sized to receive at least a portion of an alignment pin 116 therein. First end member pin receptacle 114 is positioned adjacent to edge 76 such that first end member pin receptacle 114 is axially aligned with body member first mating surface pin receptacle 112. During assembly, alignment pin 116 is at least partially received into first end member pin receptacle 114. As body member 40 and first end member 42 are coupled to one another, a remaining portion of pin 116 is then received into body member first end pin receptacle 112. Alternatively, pin 116 may first be at least partially received within body member pin receptacle 112, and then the remaining portion of pin 116 received into first end member pin receptacle 114. In yet another embodiment, housing assembly 12 does not include a pin and receptacle alignment system 110 and mating surfaces are aligned using joint 110 (shown in FIG. 5).

Similarly, body member second mating surface 62 includes at least one pin receptacle 118 (shown in FIG. 4 in two locations) disposed upon body member internal surface 48 and positioned adjacent to edge 64. Second end member 44 includes at least one pin receptacle 120 (shown in FIG. 3 in two locations) disposed upon second end member internal surface 80 and positioned adjacent to edge 88. Pin receptacles 118, 120 are sized to receive at least a portion of an alignment pin therein. Second end member pin receptacle 120 is positioned adjacent to edge 88 such that second end member pin receptacle 120 is axially aligned with body member second mating surface pin receptacle 118. During assembly, alignment pin 116 is at least partially received into second end member pin receptacle 120. As body member 40 and second end member 44 are coupled to one another, a remaining portion of pin 116 is then received into body member second end pin receptacle 118. Alternatively, pin 116 may first be at least partially received within body member pin receptacle 118, and then the remaining portion of pin 116 received into second end member pin receptacle 120.

Referring again to FIGS. 5 and 6, each exemplary joint 100, includes a first external surface 122 and an adjacent second external surface 124 that abut one another. More specifically, first external surface 122 and second external surface 124 are substantially coplanar and thereby form a substantially smooth external interface 126.

Figure 7:
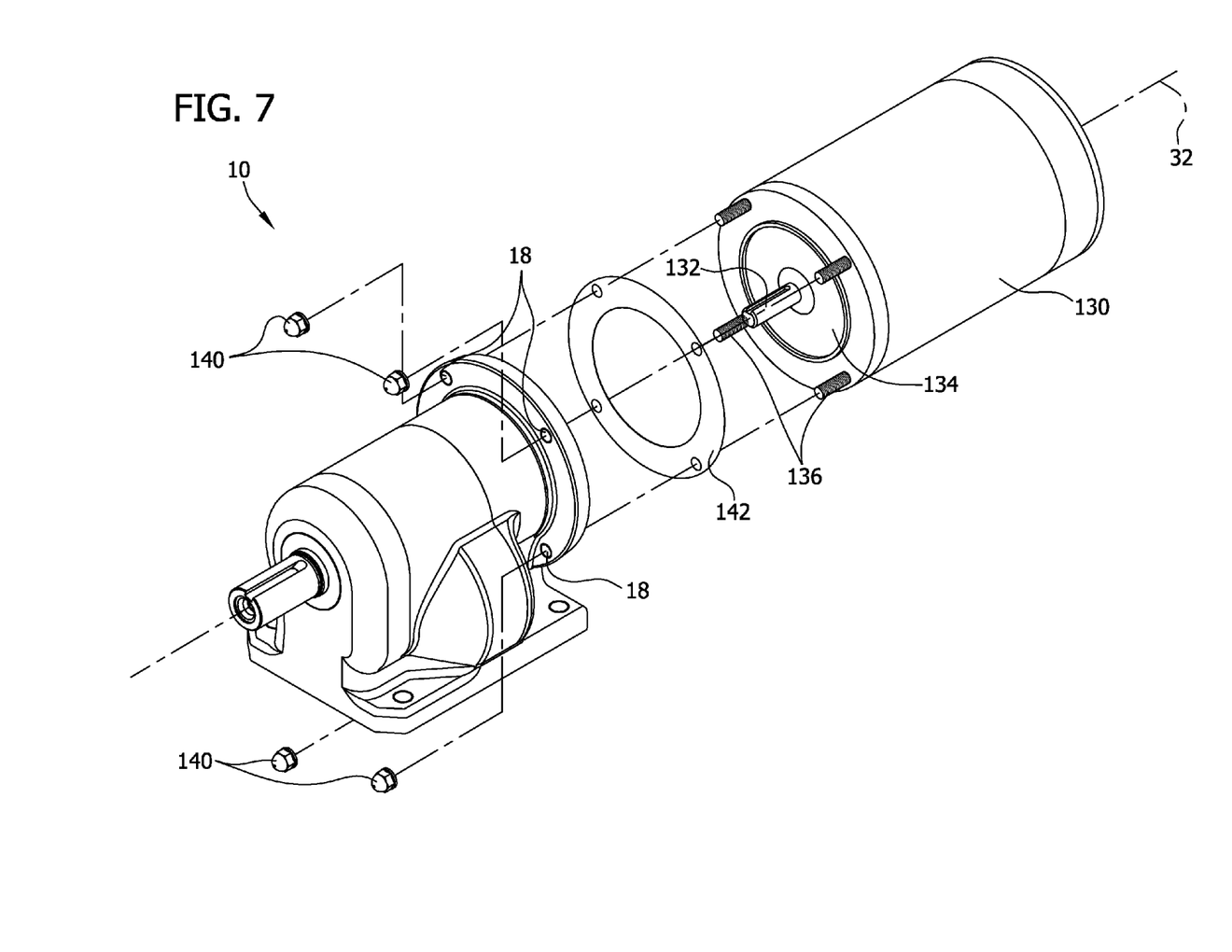
FIG. 7 is a side perspective assembly view of the gear drive shown in FIG. 1 with an exemplary input device.

FIG. 7 is a side perspective assembly view of gear drive assembly 10 shown in FIG. 1 with an exemplary input device 130. In the exemplary embodiment, input device 130 is a motor that is configured to power gear drive 13. Motor 130 includes an input shaft 132 extending coaxially with axis 32, a mounting surface 134, and at least one mounting bolt 136 extending therefrom. When assembled, motor input shaft 132 is received within gear drive quill 138 (shown in FIG. 2), and mounting bolt 136 is received within gear assembly input flange bolt hole 18. Mounting bolt 136 is then threadably secured thereto with a nut 140 (shown in FIG. 5 in three locations). In the exemplary embodiment, a gasket 142 is disposed between gear drive assembly mounting surface 134 and motor 130 and is sized and oriented to seal the interface between gear drive assembly mounting surface 134 and motor 130. Gasket 142 is fabricated from a non-absorbent, silicone-based material. Alternatively, gasket 142 is fabricated from any material that is intended for repeated use and that may be safely used in producing, manufacturing, packing, processing, preparing, treating, packaging, transporting, or holding food, and that enables the gear drive assembly 10 and motor 130 to function as described herein.

Exemplary embodiments of housings for gear drive assemblies used in the food preparation industry are described in detail above. The above-described housing assemblies fabricated from polymer-based materials that include simplified tongue and groove joint configurations mated with an adhesive may be implemented to facilitate a cost effective, more accessible and practical design for food grade gear drives. Moreover, this design eliminates metal fasteners typically used to assemble gear drive housing and thus eliminate the potential for rust to form and contaminates to collect. The embodiments contained herein also include a housing that is fabricated with a smoothly contoured external surface. This feature may be useful for eliminating areas that promote the accumulation of foreign or deleterious materials.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

Although the apparatus and methods described herein are described in the context of using a polymer-based gear drive housings for use in food preparation, it is understood that the apparatus and methods are not limited to food-grade applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gear drive assembly comprising:
   a motor including a mounting surface;
   a housing comprising:
      an end member comprising a mating surface; and
      a body member comprising a first mating surface and a second mating surface, said body member first mating surface coupled to said end member mating surface at a first interface comprising a first tongue-and-groove joint comprising a first gap between said end member mating surface and said body member first mating surface, said first gap being substantially filled with an adhesive that seals the first tongue-and-groove joint;
   a motor engaging end member comprising a mating surface and a flange configured to abut said mounting surface of said motor, said motor engaging end member mating surface coupled to said body member second mating surface at a second interface comprising a second tongue-and-groove joint comprising a second gap using said adhesive, said body member first mating surface is coplanar with said end member mating surface and said motor engaging end member mating surface is coplanar with said body member second mating surface and are configured to form a substantially continuous external surface free from grooves;
   a gear drive disposed within said housing and including a drive shaft extending through an aperture of said end member; and
   a gasket configured to seal an interface between said mounting surface of said motor and said flange.

2. A gear drive assembly in accordance with claim 1 wherein said gasket is fabricated from a silicon sheet.

3. A gear drive assembly in accordance with claim 1 wherein said end member mating surface and said body member first mating surface are aligned with at least one pin and receptacle combination.

4. A gear drive assembly in accordance with claim 1 wherein said mating surface of said motor engaging end member and said body member second mating surface are aligned with at least one pin and receptacle combination.

5. A gear drive assembly in accordance with claim 1 wherein said housing is fabricated from at least one of a polymer, a non-ferrous, and a non-corrosive material.

6. A gear drive assembly in accordance with claim 1 further comprising:
   a first surface adjacent said end member mating surface and coplanar with a second surface adjacent said body member first mating surface; and
   a third surface adjacent said motor engaging member mating surface and coplanar with a fourth surface adjacent said body member second mating surface.

7. A gear drive assembly in accordance with claim 1 further comprising a longitudinal axis, wherein said end member further comprises:
   a substantially annular aperture including a center that is radially aligned along said longitudinal axis; and
   a substantially annular sleeve including a center and coupled to said end member such that the sleeve center is radially aligned with said annular aperture along said longitudinal axis, said annular sleeve configured to receive a gear drive output shaft.

8. A gear drive assembly in accordance with claim 1 wherein said housing has a contour configured to facilitate cleaning of an outer surface of said housing.

9. A gear drive assembly in accordance with claim 1 wherein said housing is configured to house at least one of an inline gear drive, a parallel gear drive, and a right angle gear drive.

10. A gear drive assembly in accordance with claim 1, wherein at least one of said first gap and said second gap are substantially L-shaped.

11. A gear drive assembly in accordance with claim 1, wherein said first gap is sized to allow a predetermined amount of adhesive to be filed therein.

12. A gear drive assembly in accordance with claim 1, wherein said body member first mating surface is coupled to said end member mating surface without fasteners.

13. A gear drive assembly in accordance with claim 1, wherein said body member first mating surface comprises a first side wall that is positioned at a first angle with respect to said first interface and said end member mating surface comprises a second side wall that is positioned at a second angle with respect to said first interface, said first and second angles are from about 90° to about 93° as measured from said first interface.

14. A gear drive assembly in accordance with claim 1, wherein said body member second mating surface comprises a first side wall that is positioned at a first angle with respect to said second interface and said motor mating surface comprises a second side wall that is positioned at a second angle with respect to said second interface, said first and second angles are from about 90° to about 93° as measured from said second interface.

* * * * *